United States Patent [19]

Smilkstein

[11] Patent Number: 4,736,928
[45] Date of Patent: Apr. 12, 1988

[54] HAND HELD WEED PULLER TOOL

[76] Inventor: Harry Smilkstein, 105 Manchester Dr., Mount Kisco, N.Y. 10549

[21] Appl. No.: 926,085

[22] Filed: Nov. 3, 1986

[51] Int. Cl.⁴ .................................................. B66F 3/00
[52] U.S. Cl. ..................................... 254/132; 30/355; 294/55.5
[58] Field of Search ................. 30/355, 356, 343, 344, 30/150, 278; 294/55, 55.5; 254/132

[56] References Cited

U.S. PATENT DOCUMENTS

| | | | |
|---|---|---|---|
| 751,848 | 2/1904 | Goldsmith | 30/344 X |
| 2,121,265 | 6/1938 | Ruttcorn | 254/132 |
| 2,258,448 | 10/1941 | Gesell | 30/356 |
| 2,291,179 | 7/1942 | Woginrich | 30/278 X |
| 2,540,393 | 2/1951 | Hawley | 30/278 |
| 2,753,632 | 7/1956 | Varn | 30/355 |
| 3,121,951 | 2/1964 | Green | 30/150 X |
| 3,257,100 | 6/1966 | Helders | 254/132 |
| 3,798,688 | 3/1974 | Wasson | 30/355 X |

*Primary Examiner*—Douglas D. Watts
*Attorney, Agent, or Firm*—John F. Ohlandt

[57] ABSTRACT

The tool includes a handle portion and a blade portion firmly attached to and extending from one end of the handle portion. The handle portion is substantially straight and is adapted to be grasped by the four fingers of the hand exclusive of the thumb. The blade portion extends outwardly, transverse to the axis of said handle portion, and is adapted to be engaged by the thumb of the user to grasp a weed to be pulled between the blade portion and the user's thumb.

10 Claims, 1 Drawing Sheet

HAND HELD WEED PULLER TOOL

This invention relates to a small hand held tool which is primarily useful in pulling small weeds from planted areas such as gardens and lawns.

BACKGROUND OF THE INVENTION

Over the years, many appliances have been developed and sold for the purpose of digging weeds from gardens and lawns. Many of these tools are quite effective. But most of them are rather heavy and elaborate, and many of them leave rather large holes in a lawn where the weed has been removed. As a consequence, many gardeners simply pull small weeds with their fingers. This can be quite unsatisfactory because deep rooted weeds such as dandelions are difficult to grasp and dislodge from the ground, and many gardeners do not have enough strength in their fingers to grasp the weeds tightly enough to remove them from the ground. The result is that the weed is not removed at all, or is simply broken off to resprout again from the root remaining in the ground.

Accordingly, it is one object of the present invention to provide an improved hand held weed puller which is very light in weight and easy and convenient to use, and which does not necessarily leave a large hole where a weed has been removed.

Another object of the invention is to provide an improved hand held weed puller which is unusually effective in grasping and removing weeds even though it is unusually simple and inexpensive in construction.

Further objects and advantages of the invention will be apparent from the following description and the accompanying drawings.

SUMMARY OF THE INVENTION

In carrying out the invention there is provided a hand-held weed puller tool which is especially useful for the removal of small weeds from a lawn comprising a handle portion and a blade portion firmly attached to and extending from one end of said handle portion, said handle portion being substantially straight and being adapted to be grasped by the four fingers of the hand exclusive of the thumb, said blade portion extending outwardly transverse to the axis of said handle portion and being adapted to be engaged by the thumb of the user to grasp a weed to be pulled between said blade portion and the user's thumb.

DETAILED DESCRIPTION OF PREFERRED EMBODIMENTS

Figure 1:
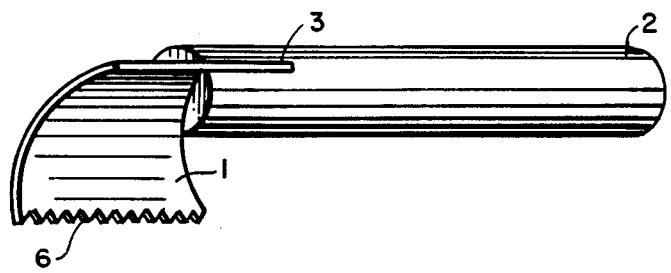
FIG. 1 is a perspective view of a preferred embodiment of the hand held weed puller of the present invention.

FIG. 1 is a perspective view of a preferred embodiment of the tool in accordance with the present invention. It includes a substantially cylindrical handle portion 2, and a blade portion 1. The blade portion 1 includes a shank 3 which extends into the handle portion 2 for attachment thereto. In a preferred embodiment, the blade portion 1 may be formed of a metal such as steel, and the handle portion 2 is formed of a molded synthetic resin material such as a phenolic. When formed in this manner, the resin handle is preferably cast or molded around the shank portion 3 of the blade 1.

Figure 2:
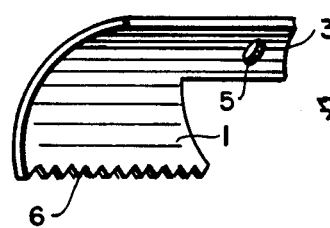
FIG. 2 is a partial view of a blade portion of the embodiment of FIG. 1.

FIG. 2 is a partial detail view of the shank portion 3 of the blade 1. Preferably, the shank portion 3 includes an opening 5 therein which is filled with the molded resin material of the handle portion 2 when the handle is cast around the shank portion 3 to assure that the parts are firmly anchored together.

As illustrated in FIG. 1, the blade portion 1 extends outwardly, transverse to the axis of the handle portion 2, and is preferably terminated with a serrated edge 6.

Figure 3:
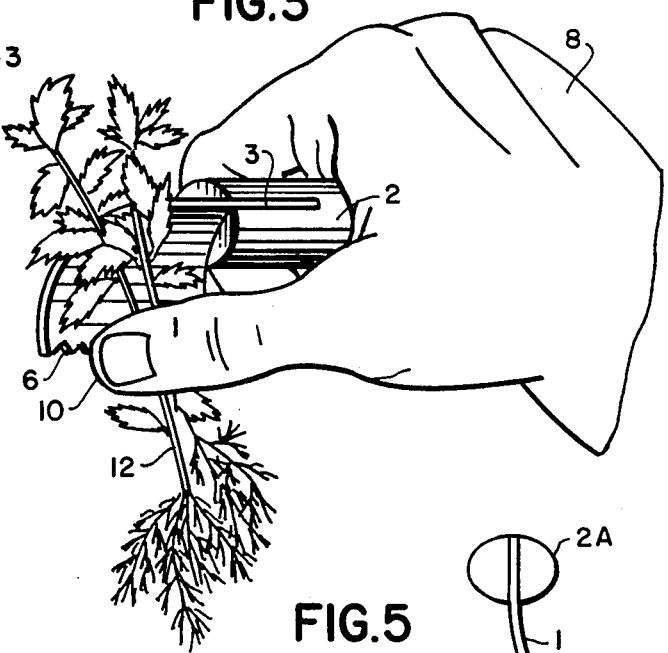
FIG. 3 is a perspective view of the hand held weed puller of FIG. 1 which is shown in the same aspect as FIG. 1, but showing how the tool is held in the hand of the user during use, and how the tool is used in opposition to the thumb of the hand of the user to tightly grasp and remove weeds.

FIG. 3 is a perspective view corresponding to the perspective view of FIG. 1, but showing the tool in use. The handle portion 2 is grasped by the hand 8 of the user with an appropriate rotational position so that the thumb 10 of the user is conveniently aligned opposite to the serrated edge 6 so as to conveniently grasp the weed 12, which is to be pulled, between the user's thumb 10 and the serrated edge 6 of the tool.

In typical use for pulling weeds, the serrated edge 6 of the tool may be used first to loosen the soil adjacent to the weed, the thumb is then engaged against the weed, and the tool is given a slight circular twist, by twisting the handle (by bending the hand downwardly at the wrist), while at the sme time raising the hand so as to easily and conveniently pull the weed. It has been found that small weeds with deep roots may be easily removed in this manner.

The tool provides a means for harnessing the force of all four fingers in opposition to the thumb in order to grasp the weed much more forcefully than would be possible without the tool. Furthermore, the serrated edge provides a means for grasping the weed firmly, even though the weed stem may be slippery and difficult to grasp firmly with the bare fingers.

If the serrated edge 6 is dulled by usage, it may be easily sharpened by a few passes of a common triangular saw file.

Figure 4:
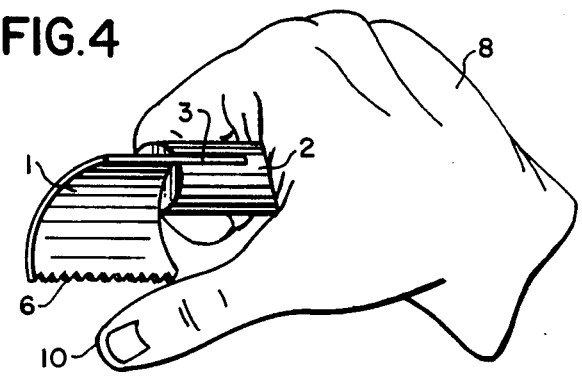
FIG. 4 is an end view of the hand held weed puller of FIG. 1 further illustrating how it is held in the hand of the user and how it is operated in opposition to the user's thumb.

FIG. 4 is a view corresponding to FIG. 3, but showing more clearly the blade end portion of the tool, and showing more clearly the relationship between the hand and the thumb of the user and the tool, when properly aligned for use.

As illustrated in the drawings, the blade 1 is preferably curved in a substantially cylindrical curve sector having a cylinder generation line which is substantially parallel to the axis of the handle 2.

Figure 5:
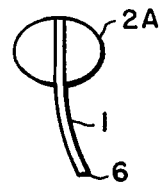
FIG. 5 is an end view corresponding to FIG. 4, but showing the tool alone in an alternative embodiment of the tool handle having an oval cross section.
Figure 6:
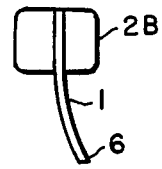
FIG. 6 is an other alternative embodiment corresponding to FIG. 5 and showing a rectangular cross section for the handle.
Figure 7:
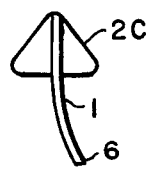
FIG. 7 is another alternative embodiment corresponding to FIG. 5 and showing a triangular cross section for the handle.

It is one of the essential requirements in the use of the tool of this invention that the handle portion 2 must be grasped firmly so that it does not rotate within the hand of the user when the blade portion 1 is opposed to the user's thumb 10. Accordingly, various alternative cross sectional shapes for the handle portion 2 may be employed to help the hand resist rotation. FIGS. 5, 6, and 7 represent such modifications.

FIG. 5 is an end view of an alternative form of the invention in which the cross section of the handle 2A is substantially an oval to assist in preventing rotation of the handle within the hand of the user.

FIG. 6 is an end view of an alternative form of the invention is which the cross section of the handle 2B is substantially a rectangle to assist in preventing rotation of the handle within the hand of the user.

FIG. 7 is an end view of an alternative form of the invention in which the cross section of the handle 2C is substantially in the shape of a triangle to assist in preventing rotation of the handle within the hand of the user.

Various other handle shapes may be employed, and the surface of the handle may be intentionally be made to be rough, or to contain small protrusions, to assist in preventing rotation of the handle within the hand of the user. These modifications for preventing rotation of the handle may be particularly important for users whose strength of grasp is limited.

The tool of the invention is illustrated in the drawings entirely in a form intended for use by right handed persons. A left handed version is substantially identical except that the blade portion 1 curves in the opposite direction. Alternatively, two blades may be provided on a single tool, one for use with the right hand, and the other for use with the left hand.

Various materials may be employed in the construction of the tool. For instance, the handle portion 2 may be constructed of wood, or may be molded of synthetic resin materials other than phenolics.

As another alternative, the tool may be formed in one piece by a steel forging, or by a one piece molding of synthetic resin material.

The dimensions of the device are not particularly critical. However, in one preferred embodiment, by way of example, a handle portion 2 axial length of about three and one half inches has been found to be very satisfactory with a handle portion 2 diameter of three quarters of a inch. The transverse extension of the blade portion is one and three sixteenths inches from the axis of the handle portions 2.

Generally, the axial length of the handle portion 2 should correspond with the width of the hand of the user as measured across the knuckles. The transverse extension of the blade portion should be related to the size of the hand and the length of the thumb. The transverse extension of the blade portion should be about one third the axial length of the handle portion 2.

It will be understood that the tool may be made in different sizes to better accommodate users having hands of different size.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A hand-held weed puller tool which is especially useful for the removal of small weeds from a lawn comprising:
   a handle portion having an axis;
   a blade portion firmly attached to and extending from one end of said handle portion; said handle portion being substantially straight and being adapted to be grasped by the forefingers of the hand exclusive of the thumb;
   said blade portion being adapted to be engaged by the thumb of the user to grasp a weed to be pulled between said blade portion and the user's thumb;
   said blade portion being curved so as to present the concave surface facing the thumb of the user when said blade portion is positioned to be engaged by the thumb of the user;
   said concave curvature of said blade being in a cylinder sector shape in which the cylinder sector generation lines are substantially parallel to the axis of said handle portion, the axis of said cylinder sector being substantially displaced from the axis of said handle portion.

2. A tool as claimed in claim 1 wherein the transverse extension of said blade portion from said handle portion is limited to about one inch and terminates in an outer edge to provide for a convenient position of said outer edge of said blade portion to be engaged by the thumb of the user.

3. A tool a claimed in claim 2 wherein said outer edge of said blade portion is serrated.

4. A tool as claimed in claim 1 wherein said handle portion has a substantially circular cross-section.

5. A tool as claimed in claim 1 wherein said handle portion includes circumferential irregularities in contour to provide for ease in gripping said handle portion while preventing rotation of said handle portion.

6. A tool as claimed in claim 5 wherein said circumferential irregularities in contour are accomplished by forming said handle with a cross-section shape having at least one substantially flat side.

7. A tool as claimed in claim 6 wherein said handle is formed with a cross-section shape of a polygon.

8. A tool as claimed in claim 7 wherein said handle is formed with a cross-section shape of a triangle.

9. A tool as claimed in claim 8 wherein said handle is formed with a cross-sectional shape of a rectangle.

10. A tool as claimed in claim 9 wherein said circumferential irregularities in contour are accomplished by forming said handle with an oval cross-section shape.

* * * * *